United States Patent
Gong et al.

(10) Patent No.: US 9,039,886 B2
(45) Date of Patent: May 26, 2015

(54) METHOD OF TRANSFERRING GRAPHENE

(71) Applicants: Kuanping Gong, Cupertino, CA (US); Lijie Ci, San Jose, CA (US); Sung-Hee Ahn, Uiwang-si (KR); Jin-Seong Park, San Jose, CA (US); Byeong-Yeol Kim, Uiwang-si (KR)

(72) Inventors: Kuanping Gong, Cupertino, CA (US); Lijie Ci, San Jose, CA (US); Sung-Hee Ahn, Uiwang-si (KR); Jin-Seong Park, San Jose, CA (US); Byeong-Yeol Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 372 days.

(21) Appl. No.: 13/659,355

(22) Filed: Oct. 24, 2012

(65) Prior Publication Data
US 2013/0220530 A1    Aug. 29, 2013

Related U.S. Application Data (60) Provisional application No. 61/602,739, filed on Feb. 24, 2012.

(51) Int. Cl.
| | |
|---|---|
| C25F 5/00 | (2006.01) |
| B32B 38/10 | (2006.01) |
| B32B 38/00 | (2006.01) |
| C01B 31/04 | (2006.01) |
| B32B 37/06 | (2006.01) |
| B32B 38/16 | (2006.01) |

(52) U.S. Cl.
CPC ............ *B32B 38/10* (2013.01); *B32B 38/0036* (2013.01); *B32B 37/06* (2013.01); *B32B 38/162* (2013.01); *C25F 5/00* (2013.01); *C01B 31/0453* (2013.01)

(58) Field of Classification Search
CPC ........................................................ C25F 5/00
See application file for complete search history.

(56) References Cited

U.S. PATENT DOCUMENTS

| | | | | |
|---|---|---|---|---|
| 3,334,029 | A * | 8/1967 | Delafosse et al. | 205/212 |
| 4,263,113 | A * | 4/1981 | Bernard | 205/721 |
| 6,998,175 | B2 * | 2/2006 | Murata et al. | 428/354 |
| 8,236,118 | B2 * | 8/2012 | Veerasamy | 156/150 |
| 2002/0070126 | A1 * | 6/2002 | Sato et al. | 205/640 |
| 2010/0021708 | A1 * | 1/2010 | Kong et al. | 428/220 |
| 2011/0091647 | A1 * | 4/2011 | Colombo et al. | 427/249.1 |
| 2011/0227000 | A1 * | 9/2011 | Ruoff et al. | 252/502 |
| 2011/0303899 | A1 * | 12/2011 | Padhi et al. | 257/29 |
| 2011/0319554 | A1 * | 12/2011 | Frazier et al. | 524/577 |
| 2012/0088039 | A1 * | 4/2012 | Yu et al. | 427/596 |

(Continued)

FOREIGN PATENT DOCUMENTS

KR   10-2011-0042023 A   4/2011

OTHER PUBLICATIONS

X. Li et al, Large-Area Synthesis of High-Quality and Uniform Graphene Films on Copper Foils, Published Online May 7, 2009, Science, vol. 324, No. 5932, 2009, pp. 1312-1314.*

(Continued)

*Primary Examiner* — Harry D Wilkins, III
(74) *Attorney, Agent, or Firm* — Lee & Morse, P.C.

(57) ABSTRACT

A method of transferring graphene includes depositing graphene on a side of at least one metal substrate to provide a metal substrate-graphene layer, stacking a target substrate on a side of the metal substrate-graphene layer to provide a stacked structure in which a side of the target substrate faces the graphene layer, and exposing the stacked structure to an electrolysis bath to remove the metal substrate and transfer the graphene onto the side of the target substrate.

15 Claims, 11 Drawing Sheets

(56) References Cited

U.S. PATENT DOCUMENTS

2014/0076721 A1* 3/2014 Han et al. .................. 204/242
2014/0076738 A1* 3/2014 Han et al. .................. 205/674
2014/0238873 A1* 8/2014 Li et al. .................... 205/644

OTHER PUBLICATIONS

A. Reina, Few-Layer Graphene Films on Arbitrary Substrates by Chemical Vapor Deposition, Nano Letters, vol. 9, No. 1, 2009, pp. 30-35.*

Y. Wang, Electrochemical Delamination of CVD-Grown Graphene Film: Toward the Recyclable Use of Copper Catalyst, ACS Nano, vol. 5, No. 12, 2011, pp. 9927-9933.*

C.-Y. Su et al, High-Quality Thing Graphene Films from Fast Electrochemical Exfoliation, ACS Nano, vol. 5, No. 3, 2011, pp. 2332-2339.*

S. Bae et al, Roll-to-roll production of 30-inch graphene films for transparent electrodes, Nature Nanotechnology, vol. 5, Jun. 2010, pp. 574-578.*

* cited by examiner

METHOD OF TRANSFERRING GRAPHENE

CROSS-REFERENCE TO RELATED APPLICATIONS

This application claims priority under 35 U.S.C. §119(e) to U.S. Provisional Application No. 61/602,739, filed in the United States Patent and Trademark Office on Feb. 24, 2012, the entire contents of which are incorporated herein by reference.

BACKGROUND

1. Field

Embodiments relate to a method of transferring graphene.

2. Description of the Related Art

Graphene is a nano material having stable electrical, mechanical, and chemical characteristics and high electrical conductivity. Graphene may be synthesized in a large area on a metal substrate and may be transferred to a substrate of an electronic device.

SUMMARY

Embodiments are directed to a method of transferring graphene, including depositing graphene on a side of a metal substrate to provide a metal substrate-graphene layer, stacking a target substrate on the metal substrate-graphene layer to provide a stacked structure in which a side of the target substrate faces the graphene layer, and passing the stacked structure through an electrolysis bath to remove the metal substrate and transfer the graphene onto the side of the target substrate.

The electrolysis bath may include electrodes including a positive (+) electrode and a negative (−) electrode, and a solution. When the stacked structure is passed through the electrolysis bath, a metal included in the metal substrate may be oxidized to form a metal ion in the (+) electrode, and the formed metal ion may be reduced and precipitated to a metal in the (−) electrode.

A voltage of about 0.001V to about 100V may be applied to the electrodes.

The stacked structure may be provided by stacking the target substrate on the metal substrate-graphene layer and passing the stacked target substrate and metal substrate-graphene layer through a roller device.

The stacking of the target substrate on the metal substrate-graphene layer may include at least one of forming a polymer binder film between the metal substrate-graphene layer and the target substrate, and performing a heat treatment on the target substrate on the metal substrate-graphene layer.

The stacking of the target substrate on the metal substrate-graphene later may include forming the polymer binder film. The polymer binder film may include at least one selected from polystyrene, polyethylene glycol, poly(methyl methacrylate), polyvinylpyrrolidone, Nafion®, poly(acrylic acid) sodium, poly(diallyldimethyl ammonium chloride), and polyethylenimine.

The stacking of the target substrate on the metal substrate-graphene layer may include performing the heat treatment. The heat treatment may be performed at a temperature of about 60° C. to about 200° C.

The depositing of graphene on a side of a metal substrate to provide a metal substrate-graphene layer may include depositing the graphene on at least one side of each of at least two metal substrates to provide at least two metal substrate-graphene layers. The stacking of the target substrate on the metal substrate-graphene layer to provide the stacked structure may include stacking one target substrate between each of the at least two metal substrate-graphene layers to provide the stacked structure in which both sides of the target substrate face a graphene layer of one of the metal substrate-graphene layers. The passing of the stacked structure through the electrolysis bath may transfer the graphene onto both sides of the target substrate.

The depositing of graphene on a side of a metal substrate to provide a metal substrate-graphene layer may include depositing the graphene on two sides of at least one metal substrate to provide at least one graphene layer-metal substrate-graphene layer. The stacking of the target substrate on the metal substrate-graphene layer to provide the stacked structure may include stacking one target substrate on each side of the at least one graphene layer-metal substrate-graphene layer to provide the stacked structure in which at least one side of each target substrates faces a graphene layer of one of the two sides of the at least one metal substrate-graphene layer. The passing of the stacked structure through the electrolysis bath may transfer the graphene onto the at least one side of the each of the target substrates.

After the transferring of the graphene on at least one side of the target substrate, the method may include stacking another target substrate on the graphene layer transferred onto the side of the target substrate.

The stacked structure may be directed to pass through the electrolysis bath by a roller device.

The metal substrate may include at least one metal or alloy selected from Cu, Ni, Co, Fe, Pt, Au, Ru, Al, Cr, Mg, Mn, Mo, Rh, Si, Ta, Ti, W, U, V, Zr, brass, bronze, white brass, stainless steel, and Ge.

The target substrate may include at least one selected from a thermal release tape, a polyethylene terephthalate substrate, a polyimide substrate, a polyethylene naphthalate substrate, a polycarbonate substrate, a glass substrate, a silicon wafer, a porous inorganic or organic membrane, a metal-organic frame, an ion-exchange film, and a membrane electrode.

The method may further include cleaning the transferred graphene on the target substrate.

The graphene transferred to the target substrate may have an electrical resistance of about 1 to about 10000 Ω/sq.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Graphene has a high electrical conductivity and flexibility and may be synthesized in a large area on a metal substrate. After graphene is grown on a metal substrate, the graphene may be transferred to a target substrate. The target substrate to which the graphene is transferred may be used for an electronic device.

A method of transferring graphene according to one embodiment includes depositing graphene on at least one side of at least one metal substrate to provide at least one metal substrate-graphene layer; stacking at least one target substrate on at least one side of the metal substrate-graphene layer to provide a stacked structure; and passing the stacked structure through an electrolysis bath to remove the metal substrate and transfer the graphene onto at least one side of the target substrate. Herein, although "a" metal substrate, "a" metal substrate-graphene layer, and "a" target substrate are referred to for convenience, it is to be understood that a plurality of metal substrates, graphene layers, and target substrates may be used to simultaneously provide a plurality of target substrates each having a graphene layer transferred thereto or one or more target substrate having graphene layers applied to both sides of the target substrate.

The electrolysis bath may include electrodes including a positive (+) electrode and a negative (−) electrode, and a solution. The solution may include an organic electrolyte or may be an aqueous solution. Examples of the organic electrolyte include N,N-dimethylmethanamide, acetonitrile, propylene carbonate, benzene or its derivatives, dimethyl sulfoxide, tetrahydrofuran, or the like. Examples of the aqueous solution may include a copper sulfate aqueous solution or a nitric acid aqueous solution. For example, an aqueous solution may be used in view of an etching range.

The solution is electrolyzed as the stacked structure passes through an electrolysis bath. For example, a metal included in the metal substrate may be oxidized to form a metal ion at the (+) electrode (metal substrate), and the formed metal ion may be reduced and precipitated to a metal in the (−) electrode. The total reaction may be a reaction that transfers metal from the (+) electrode (metal substrate) to the (−) electrode. The metal substrate is etched through the reaction. Accordingly, the metal substrate may be removed from the stacked structure.

The etching rate may be controlled by applying a voltage of a predetermined range, for example, about 0.001V to about 100V, or about 0.001V to about 3.0V, or about 0.005V to about 3.5V, to the electrode metal. The entire electrochemical reaction may provide that metal transfers from the metal substrate to the (−) electrode without a chemical change, such as a change to the composition of an aqueous solution. Therefore, a large-area graphene layer may be easily transferred to the substrates of diverse electronic devices in an environmental-friendly way within a short time.

The etching rate may be analyzed by an electrochemical measuring method such as square wave-voltammetry, cyclic-voltammetry, staircase-voltammetry chronoamperometry, chronocoulometry, chronopotentiometry, multi-current steps, and the like.

The metal substrate may include at least one metal or alloy selected from Cu, Ni, Co, Fe, Pt, Au, Ru, Al, Cr, Mg, Mn, Mo, Rh, Si, Ta, Ti, W, U, V, Zr, brass, bronze, white brass, stainless steel, and Ge. For example, at least one metal or alloy selected from Cu and Ni may be used.

The metal substrate-graphene layer may be formed by depositing the graphene on at least one metal substrate using chemical vapor deposition (CVD) process. For example, the graphene may be deposited using rapid thermal chemical vapor deposition (RTCVD), inductively coupled plasma-chemical vapor deposition (ICP-CVD), low pressure chemical vapor deposition (LPCVD), atmospheric pressure chemical vapor deposition (APCVD), metal organic chemical vapor deposition (MOCVD), plasma-enhanced chemical vapor deposition (PECVD), or the like.

When the graphene is deposited on the metal substrate, the deposition may be conducted at a temperature in a range of from about 300° C. to a value slightly lower than a melting point of the metal substrate, and at a pressure in a range of about $10^{-7}$ mTorr to an atmospheric pressure.

The target substrate onto which the graphene is transferred may include at least one selected from a thermal release tape, a polyethylene terephthalate substrate, a polyimide substrate, a polyethylene naphthalate substrate, a polycarbonate substrate, a glass substrate, a silicon wafer, a porous inorganic or organic membrane, a metal-organic frame, an ion-exchange film, and a membrane electrode.

The stacked structure may be formed in a roll-to-roll process. Particularly, the stacked structure may be formed by stacking the target substrate over the metal substrate-graphene layer and passing the stacked target substrate and metal substrate-graphene layer through a roller device. The roller device may include at least one roller. If desired, the roller device may include a plurality of rollers that face each other or a series of such rollers.

When a stacked structure is formed using the roll-to-roll process, the target substrate may be stacked on the metal substrate-graphene layer by forming a polymer binder film between the metal substrate-graphene layer and the target substrate, or the target substrate may be stacked on the metal substrate-graphene layer through a heat treatment. According to an implementation, the target substrate may be stacked on the metal substrate-graphene layer by using both of these methods.

The polymer binder film may include at least one selected from polystyrene, polyethylene glycol, poly(methyl methacrylate), polyvinylpyrrolidone, Nafion®, poly(acrylic acid) sodium, poly(diallyldimethyl ammonium chloride), and polyethylenimine.

The polymer binder film may be pre-formed on either the target substrate or the deposited graphene surface using any appropriate approach.

The heat treatment may be performed at a temperature of about 60° C. to about 200° C., or, for example at a temperature of about 120° C. to about 160° C. When the heat treatment is performed within this temperature range, a binding between the graphene and the target substrate may be enhanced.

The stacking may be performed at room temperature and at an atmospheric pressure.

The stacked structure may be directed through the electrolysis bath by using the roller device. As the stacked structure passes through the electrolysis bath, the metal substrate is removed and the graphene is transferred to the target substrate.

The method of transferring the graphene may include a both sides transfer process, or a continuous process.

The both sides transfer process may be performed as follows.

The method of transferring graphene may include depositing the graphene on at least one side of each of at least two metal substrates to provide at least two metal substrate-graphene layers, stacking at least one target substrate between each of metal substrate-graphene layers to provide a stacked structure, and passing the stacked structure through an electrolysis bath to remove the metal substrate and transfer the graphene onto both sides of the target substrate.

The continuous process may be performed as follows.

The method of transferring graphene may include depositing graphene on at least one side of at least one metal substrate to provide at least one metal substrate-graphene layer, stacking at least one target substrate on the at least one side of the metal substrate-graphene layer to provide a stacked structure, passing the stacked structure in an electrolysis bath to remove the metal substrate and transfer the graphene on at least one side of the target substrate, and stacking another target substrate onto the graphene transferred onto the target substrate.

Both of the both side transfer process and the continuous process may be performed by using the roll-to-roll process.

A process of cleaning the transferred graphene on the target substrate may be performed. Also, a drying process may be performed. The cleaning and drying processes may be performed through a roll-to-roll process.

In the cleaning process, an organic solution or deionized water may be used to completely remove a residual metal or a residual metal oxide from the surface of the graphene transferred on the target substrate. Exemplary organic solutions may include isopropylalcohol, a nitric acid etchant, a hydrogen peroxide etchant, a chromate-based etchant, an oxone-based etchant, a ferrite-based etchant, or the like. Examples of the organic solution may include an $HNO_3$—$H_2SO_4$—$HCl$ solution, an $NaNO_3$—$H_2SO_4$—$HCl$ solution, an $Na_2Cr_2O_7$—$H_2SO_4$—$HCl$ solution, a $K_2Cr_2O_7$—$H_2SO_4$ solution, an $H_2O_2$—$H_2SO_4$ solution, an $H_2O_2$—$H_3PO_4$—$HCl$ solution, or the like.

The graphene transferred to the target substrate may have an electrical resistance of about 1 to about 10000 Ω/sq, or, for example, about 10 to about 1000 Ω/sq. With an electrical resistance within this range, the graphene transferred to the target substrate may have high electrical conductivity. In addition, the graphene may have excellent transparency.

The method of transferring graphene may be exemplarily described with reference to FIGS. 1 and 2A to 2C.

Figure 1:
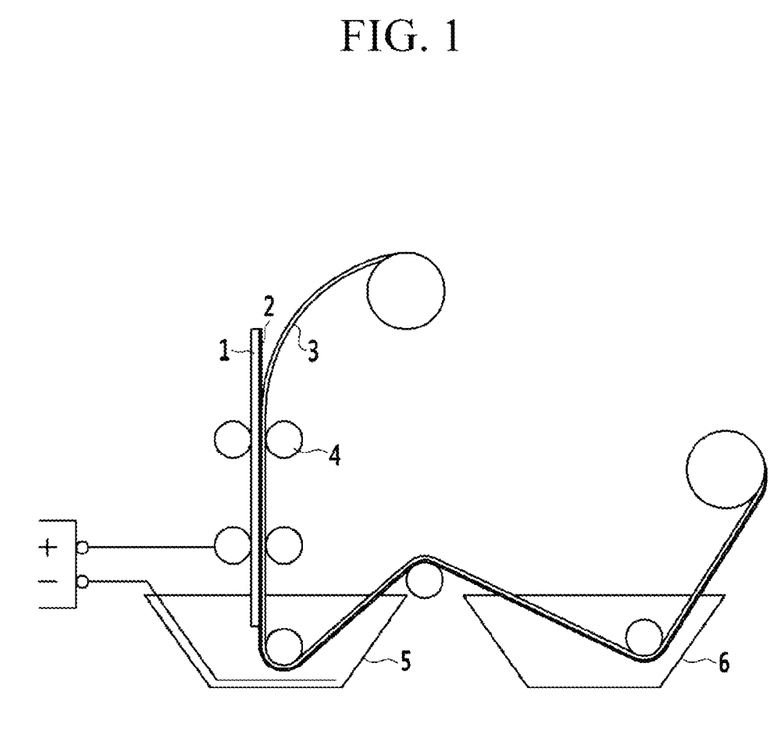
FIG. 1 illustrates a schematic view showing a method of transferring graphene using an electrolysis bath according to an embodiment.

FIG. 1 is a schematic view showing a method of transferring graphene using an electrolysis bath according to an embodiment.

Referring to FIG. 1, a metal substrate-graphene layer may be formed by depositing graphene 2 on one side of a metal substrate 1. Then, a stacked structure may be formed by stacking a target substrate 3 on the metal substrate-graphene layer and passing the stacked target substrate 3 and metal substrate-graphene layer through a roller device that includes a plurality of rollers 4. Subsequently, the stacked structure may pass through an electrolysis bath 5 as directed by the roller device including the rollers 4. As the metal substrate 1 is removed in the electrolysis bath 5, the graphene 2 may be transferred onto the target substrate 3. Subsequently, the target substrate 3 to which the graphene 2 is transferred may pass through a cleaning bath 6 to be cleaned as directed by the roller device including the rollers 4.

Figure 2A:
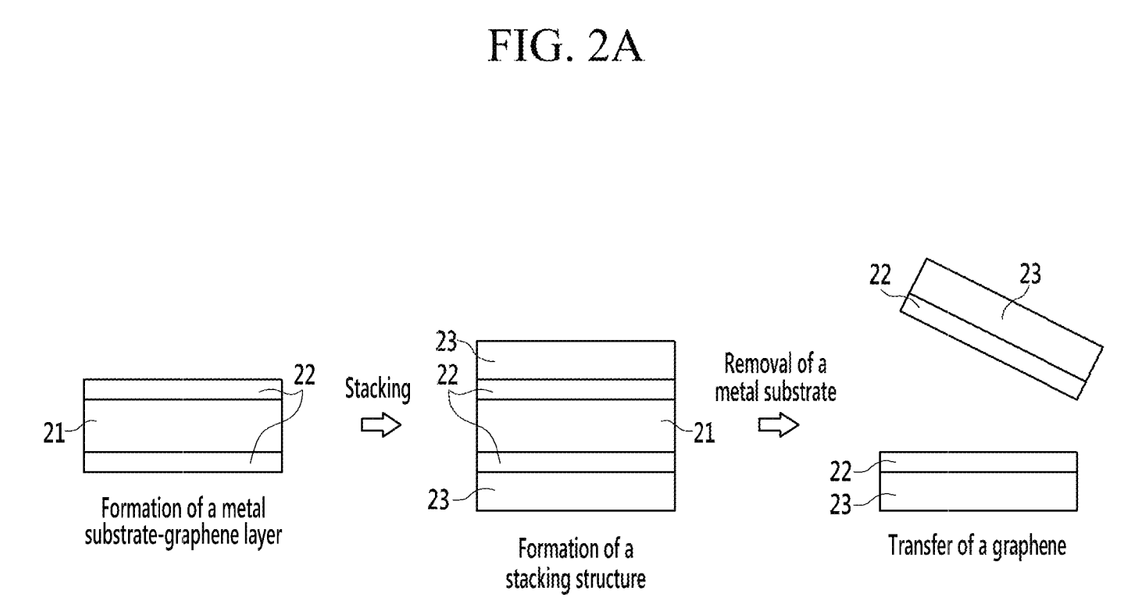
FIGS. 2A to 2C illustrate schematic views showing methods of transferring graphene according to embodiments.
Figure 2B:
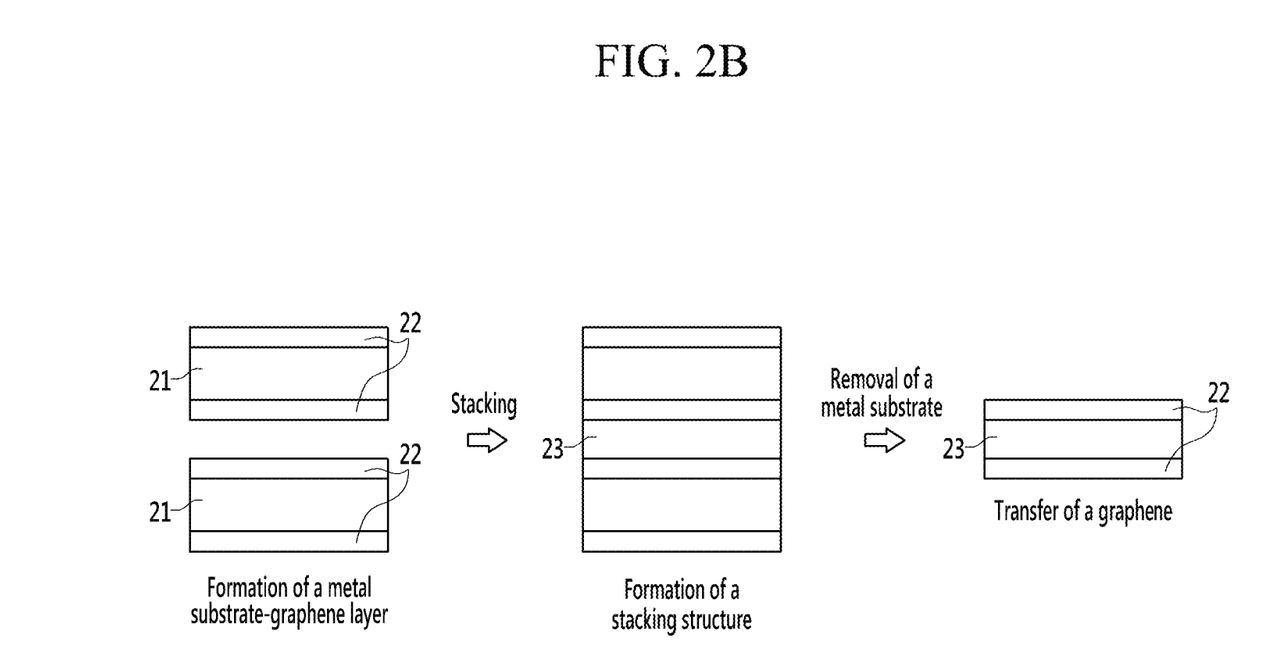
Figure 2C:
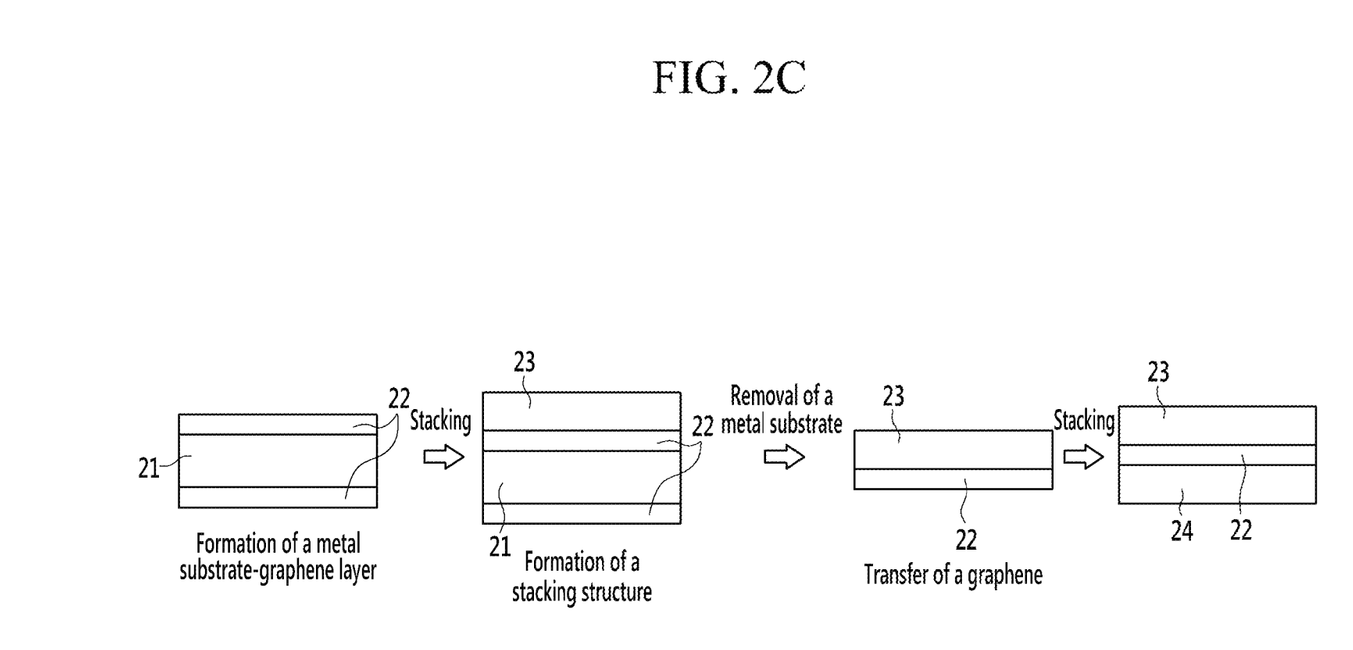

FIGS. 2A to 2C are schematic views showing methods of transferring graphene according to embodiments.

Referring to FIG. 2A, a metal substrate-graphene layer may be formed by depositing graphene 22 on both sides of one metal substrate 21. After preparing two target substrates 23, a stacked structure may be formed by stacking each of the target substrates 23 on respective sides of the metal substrate-graphene layer and passing the stacked target substrates 23 and metal substrate-graphene layer through the roller device. Subsequently, the stacked structure may pass through an electrolysis bath as directed by the roller device. As the metal substrate 21 is removed, the graphene 22 may be transferred onto one side of each of the target substrates 23.

Referring to FIG. 2B, after preparing two metal substrates 21, two metal substrate-graphene layers may be formed by depositing graphene 22 on both sides of each metal substrate 21. Then, a stacked structure may be formed by stacking one target substrate 23 between each of the metal substrate-graphene layers and passing the stacked metal substrates and target substrate 23 through the roller device. Subsequently, the stacked structure may pass through an electrolysis bath as directed by the roller device. As the metal substrate 21 is removed, the graphene 22 may be transferred to both sides of the target substrate 23.

Referring to FIG. 2C, a metal substrate-graphene layer may be formed by depositing graphene 22 on both sides of one metal substrate 21, and then, a stacked structure may be formed by stacking a target substrate 23 on one side of the metal substrate-graphene layer and passing the stacked target substrate 23 and metal substrate-graphene layer through the roller device. Subsequently, the stacked structure may be passed through an electrolysis bath using the roller device. As the metal substrate 21 is removed, the graphene 22 may be transferred onto one side of the target substrate 23. Subsequently, another target substrate 24 may be stacked on the graphene 22 transferred onto the target substrate 23. According to the above method, the graphene may be continuously transferred onto a plurality of the target substrates.

FIGS. 2A to 2C show examples of depositing the graphene 22 on the both sides of metal substrates 21. However, in order to increase the etching rate in which the metal substrate is subsequently removed, a plasma treatment may be applied to remove the graphene on an opposite surface of the metal substrate from where the target substrate is stacked so that the metal is exposed completely to the electrolysis bath.

When graphene is transferred by etching a metal substrate through an electrochemical method using the electrolysis bath, the roll-to-roll process may be easily used. Therefore, the process may be performed easily, and environmental pollution may be prevented. A large-area graphene layer may be transferred to diverse substrates of electronic devices within a short time.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Example 1

Figure 3:
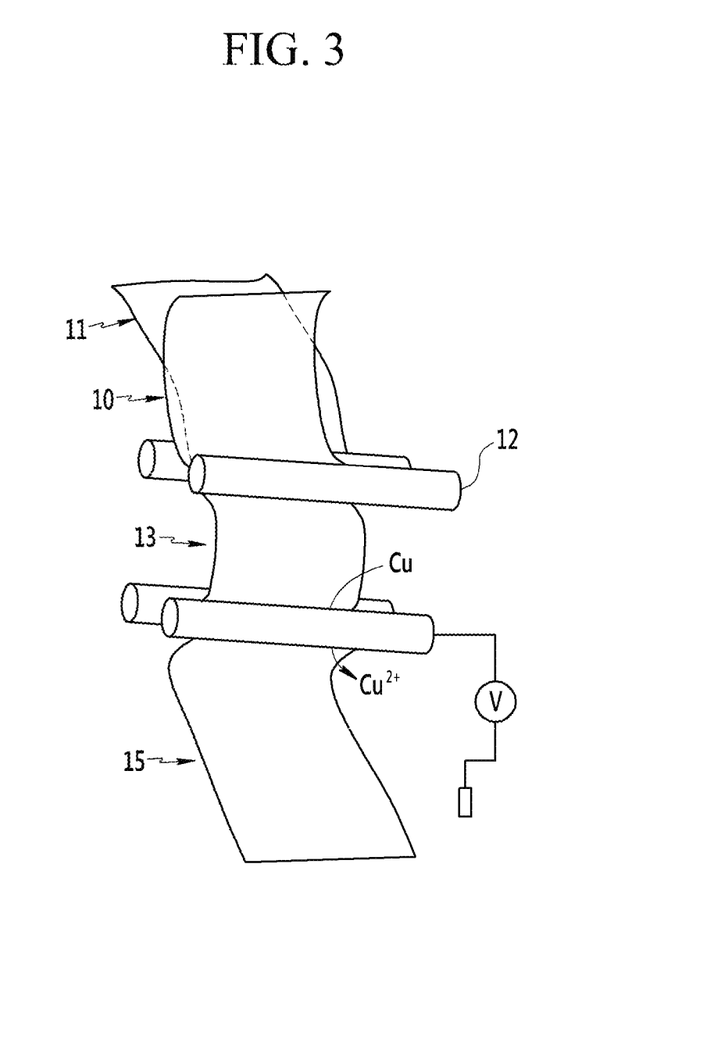
FIG. 3 illustrates a schematic view showing a method of transferring graphene according to Example 1.

FIG. 3 is a schematic view showing a method of transferring graphene according to Example 1.

Referring to FIG. 3, a copper substrate-graphene layer 10 was formed by depositing a single graphene sheet on one side of a copper substrate (having a length of 10 cm, width of 4 cm, and thickness of 25 μm) through a low-pressure chemical vapor deposition (CVD) process. Then, a stacked structure 13 was formed by stacking a thermal release tape 11 on the copper substrate-graphene layer 10 and passing the stacked thermal release tape/copper substrate-graphene layer 10 through a roller device including a plurality of rollers 12. The stacking was performed at room temperature and under atmospheric pressure.

Subsequently, the copper substrate was removed and the graphene 15 was transferred onto the thermal release tape 11 by passing the stacked structure 13 through the electrolysis bath 14 by using the roller device including the rollers 12. The passing of the stacked structure 13 through the electrolysis bath 14 was carried out for 50 minutes per 400 cm² at a constant current of 0.9 A.

Subsequently, the thermal release tape 11 onto which the graphene 15 was transferred was passed through a cleaning bath as directed by the roller device including the rollers 12 (see FIG. 1) to clean the graphene.

The reaction in the electrolysis bath 14 is described with reference to FIG. 4.

Figure 4:
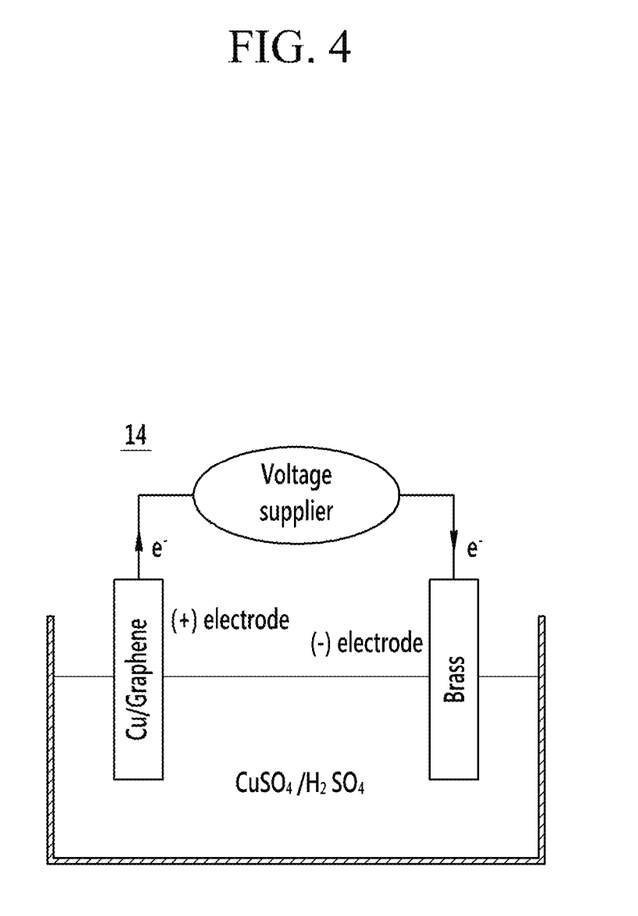
FIG. 4 illustrates a schematic view showing an electrolysis bath used in Example 1.

FIG. 4 is a schematic view showing an electrolysis bath used in Example 1. Referring to FIG. 4, the electrolysis bath 14 included a (+) electrode and a (−) electrode put into an aqueous solution. The aqueous solution was a $CuSO_4$ aqueous solution in which the pH was controlled to a pH of 1 to 2 by using $H_2SO_4$. The copper was oxidized at the (+) electrode to produce copper ions, and the copper ions were reduced to copper at the (−) electrode by applying a voltage of 3.5V to the electrodes.

Example 2

A copper substrate-graphene layer was formed by depositing a single graphene sheet on one side of a copper substrate (having a length of 10 cm, width of 4 cm, and thickness of 25 μm) through a low-pressure chemical vapor deposition (CVD) process. Then, a poly(methyl methacrylate) (PMMA) film was formed on the copper substrate-graphene layer by spin-coating. Subsequently, a stacked structure was formed by stacking a silicon wafer on the copper substrate-graphene layer and passing the stacked silicon wafer and copper substrate-graphene layer through a roller device including a plurality of rollers. The stacking was performed at room temperature under an atmospheric pressure. Subsequently, the copper substrate was removed, the PMMA was dissolved by acetone, and the graphene was transferred onto the silicon wafer by passing the stacked structure through the electrolysis bath using the roller device. The passing of the stacked structure through the electrolysis bath was carried out for 50 minutes. Subsequently, the silicon wafer onto which the graphene was transferred was passed through a cleaning bath as directed by the roller device to clean the graphene.

The electrolysis bath included a (+) electrode and a (−) electrode put into a 3.0M $HNO_3$ aqueous solution. A voltage of 3.5V was applied to the electrodes.

Comparative Example 1

A metal substrate-graphene layer was formed by depositing a graphene sheet onto a 25 μm-thick copper thin film (Alfar) through a low-pressure chemical vapor deposition (CVD) process. A stacked structure was formed by coating the upper surface of the metal substrate-graphene layer with a thermal release tape using a roller device. The coating was performed at room temperature under an atmosphere pressure.

Subsequently, the copper foil was removed by immersing the stacked structure in a 50 g/L $Fe(NO_3)_3$ aqueous solution using the roller device, and a graphene layer was transferred onto the thermal release tape. Subsequently, the graphene transferred to the thermal release tape was cleaned twice.

Evaluation 1: Polarization Curved Line Evaluation of (+) Electrode of Metal and Graphene Polarization curved lines of the copper and graphene of Example 1 at a (+) electrode were analyzed to control the etching rate of the metal. The analysis result is shown in FIG. 5.

Figure 5:
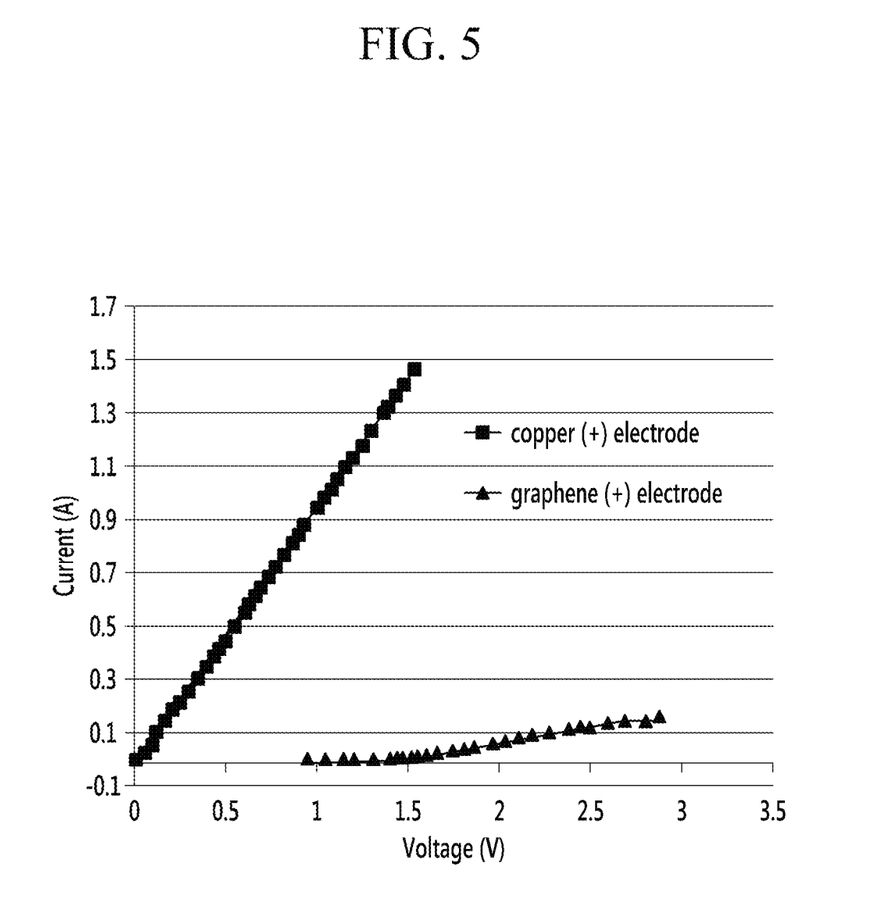
FIG. 5 illustrates a graph showing a curved line of a (+) electrode used in Example 1.

FIG. 5 is a graph showing a curved line of a (+) electrode used in Example 1.

Referring to FIG. 5, in the copper electrode, current was output at voltages as low as 0.05 V, and the current increased steeply as the voltage increased. On the other hand, in the graphene electrode, current was hardly produced even at voltages as high as 3.5V. Thus, it may be seen that the graphene is chemically and electrochemically stable. The current output at the graphene electrode is believed to be due to the oxidation of water. Accordingly, it may be seen that the metal substrate may be removed by controlling the etching rate of the metal while maintaining the quality of graphene, by adjusting the voltage within the indicated range.

Evaluation 2: Optical Microscope Photograph Analysis of Graphene Transferred to the Target Substrate FIG. 6 is an optical microscope photograph (magnified ×500) showing the graphene transferred to the target substrate in Example 1.

Figure 6:
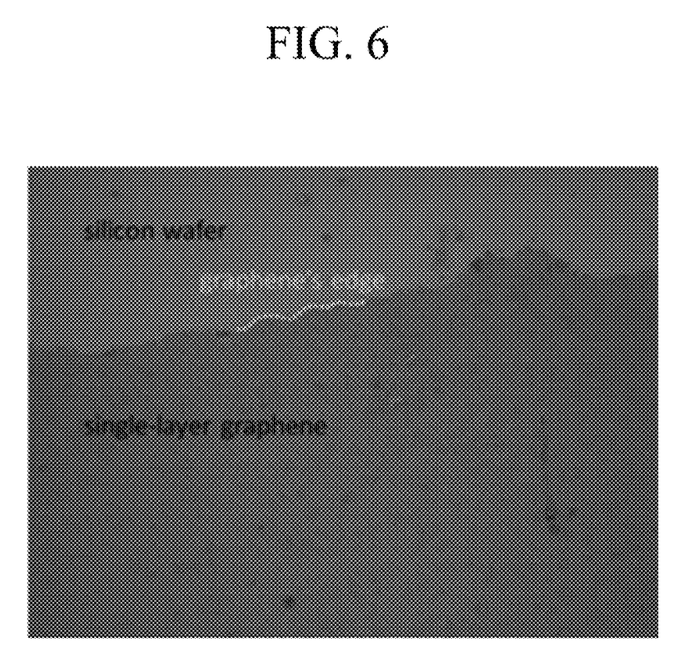
FIG. 6 illustrates an optical microscope photograph showing the graphene transferred to the target substrate in Example 1.

Referring to FIG. 6, it may be seen that the graphene was well formed on the target substrate according to the transferring method of Example 1.

Evaluation 3: Etching Time and Etching Rate Analysis of Metal Substrate

Figure 7:
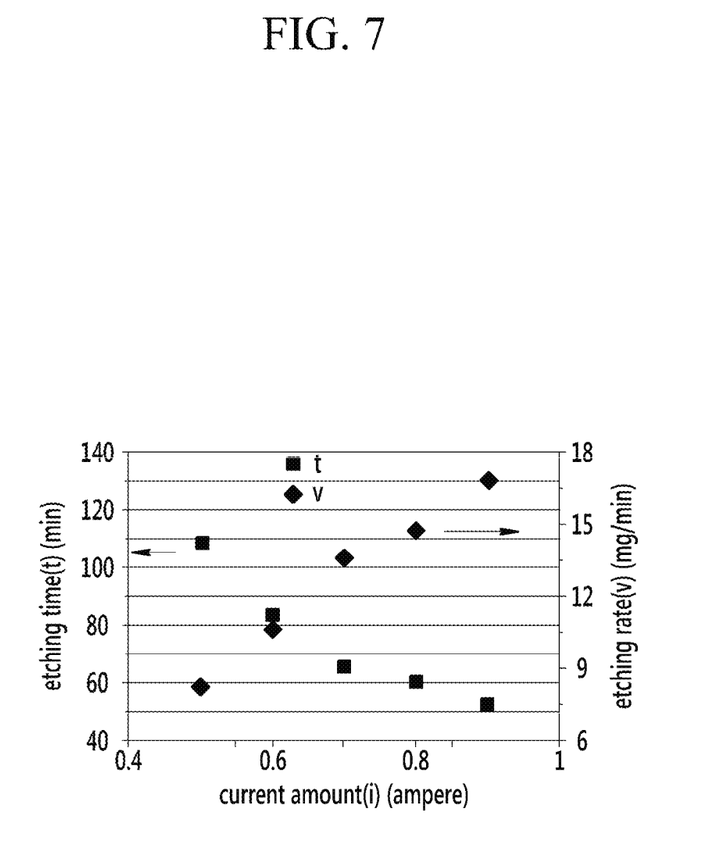
FIG. 7 illustrates a graph showing an etching time and etching rate of the metal substrate according to Example 1.

FIG. 7 is a graph showing an etching time and etching rate of the metal substrate according to Example 1.

Referring to FIG. 7, when the metal substrate was etched using an electrolysis bath according to Example 1, as the current amount was increased, the etching rate (indicated by diamond symbols) was increased while the etching time (indicated by square symbols) was decreased.

Evaluation 4: Electrical Resistance Analysis of Graphene Transferred to the Target Substrate FIG. 8 is a photograph showing a measurement of electrical resistance of the graphene transferred to the target substrate according to Comparative Example 1, and FIG. 9 is a photograph showing a measurement of electrical resistance of the graphene transferred to the target substrate according to Example 1.

Figure 8:
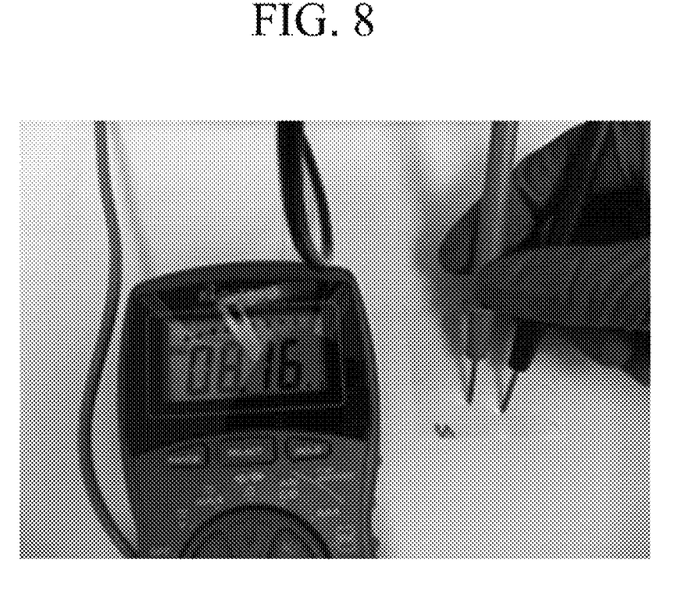
FIG. 8 illustrates a photograph showing a measurement of electrical resistance of the graphene transferred to the target substrate according to Comparative Example 1.
Figure 9:
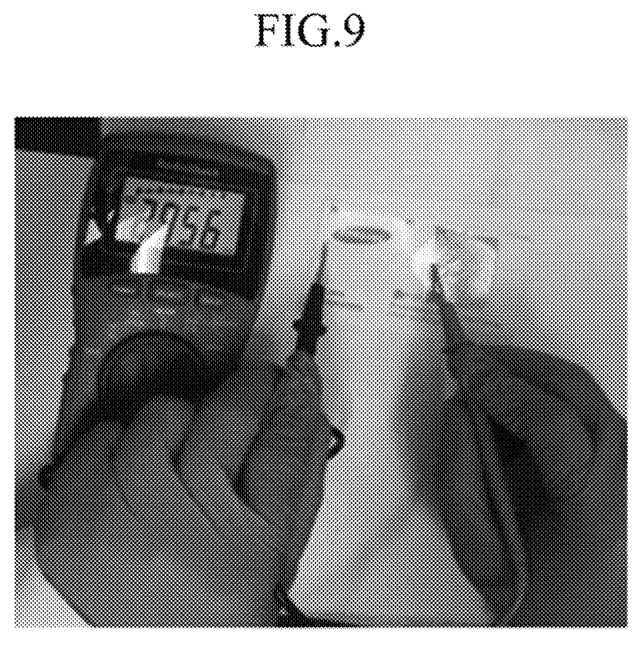
FIG. 9 illustrates a photograph showing a measurement of electrical resistance of the graphene transferred to the target substrate according to Example 1.

Referring to FIGS. 8 and 9, in the case of Example 1 where graphene was transferred to a target substrate by etching a metal substrate through an electrochemical method, the electrical resistance value was 2.956 KΩ. In the case of Comparative Example 1 using a chemical etching solution, the electrical resistance value was 8.16 KΩ. Accordingly, the electrical resistance value in the case of Example 1 was low compared with that of Comparative Example 1. Also, it may be seen that the graphene provided in Example 1 had high transparency. Thus, it may be seen that the graphene transferred to the target substrate according to Example 1 had high electrical conductivity and transparency.

By way of summation and review, graphene may be synthesized over a large area on a metal substrate and transferred to a substrate of an electronic device.

According to a general method of transferring a large-area graphene layer, a graphene layer is transferred by laminating a metal substrate where a graphene layer is grown with a substrate of an electronic device, immersing the stacked structure in an etching solution, and etching the metal substrate. In other words, according to the general graphene layer transferring method, the metal is etched using an etching solution. Accordingly, it may take a long time to perform the etching. The etching solution may react with the metal, thereby decreasing the concentration of the etching solution, which may lead to a slow etching rate. Also, the use of the etching solution may cause environmental pollution.

When graphene is transferred through an electrochemical method using an electrolysis bath according to embodiments, in particular, a method of etching a metal substrate through electrolysis, the process may be easy, and environmental contamination may be prevented, compared with a case where graphene is transferred through a method of chemically etching a metal substrate using an chemical etching solution that may provide a chemical oxidizing process. Also, when a chemical etching solution is used, the etching rate may be slow and the etching time may be long. On the other hand, when etching is performed through electrolysis in accordance with an embodiment, etching time may be remarkably shortened, transferring graphene within a short time. Accordingly, a large-area graphene layer may be easily transferred to diverse substrates of electronic devices in an environmental-friendly way within a short time.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of transferring graphene, the method comprising:
   depositing graphene on a side of a metal substrate to provide a metal substrate-graphene layer;
   stacking a target substrate on the metal substrate-graphene layer to provide a stacked structure in which a side of the target substrate faces the graphene layer; and
   passing the stacked structure through an electrolysis bath to etch the metal substrate and transfer the graphene onto the side of the target substrate.

2. The method as claimed in claim 1, wherein:
   the electrolysis bath includes electrodes including a positive (+) electrode and a negative (−) electrode, and a solution, and
   when the stacked structure is passed through the electrolysis bath, a metal included in the metal substrate is oxidized to form a metal ion in the (+) electrode, and the formed metal ion is reduced and precipitated to a metal in the (−) electrode.

3. The method as claimed in claim 2, wherein a voltage of about 0.001V to about 100V is applied to the electrodes.

4. The method as claimed in claim 1, wherein the stacked structure is provided by stacking the target substrate on the metal substrate-graphene layer and passing the stacked target substrate and metal substrate-graphene layer through a roller device.

5. The method as claimed in claim 4, wherein the stacking of the target substrate on the metal substrate-graphene layer includes at least one of:
   forming a polymer binder film between the metal substrate-graphene layer and the target substrate, and
   performing a heat treatment on the target substrate on the metal substrate-graphene layer.

6. The method as claimed in claim 5, wherein:
   the stacking of the target substrate on the metal substrate-graphene later includes forming the polymer binder film, and
   the polymer binder film includes at least one selected from polystyrene, polyethylene glycol, poly(methyl methacrylate), polyvinylpyrrolidone, Nafion®, poly(acrylic acid) sodium, poly(diallyldimethyl ammonium chloride), and polyethylenimine.

7. The method as claimed in claim 5, wherein:
   the stacking of the target substrate on the metal substrate-graphene layer includes performing the heat treatment, and
   the heat treatment is performed at a temperature of about 60° C. to about 200° C.

8. The method as claimed in claim 1, wherein:
   the depositing of graphene on the side of the metal substrate to provide the metal substrate-graphene layer includes depositing the graphene on at least one side of each of at least two metal substrates to provide at least two metal substrate-graphene layers;
   the stacking of the target substrate on the metal substrate-graphene layer to provide the stacked structure includes stacking one target substrate between each of the at least two metal substrate-graphene layers to provide the stacked structure in which both sides of the target substrate face a graphene layer of one of the metal substrate-graphene layers; and
   the passing of the stacked structure through the electrolysis bath transfers the graphene onto both sides of the target substrate.

9. The method as claimed in claim 1, wherein:
   the depositing of graphene on the side of the metal substrate to provide the metal substrate-graphene layer includes depositing the graphene on two sides of the metal substrate to provide a metal substrate-graphene layer having graphene on two sides;
   the stacking of the target substrate on the metal substrate-graphene layer to provide the stacked structure includes stacking one target substrate on each side of the metal substrate-graphene layer to provide the stacked structure in which a facing side of each target substrate faces a graphene layer of one of the two sides of the metal substrate-graphene layer having graphene on two sides; and
   the passing of the stacked structure through the electrolysis bath transfers the graphene onto the facing side of the each of the target substrates.

10. The method as claimed in claim 1, further comprising, after transferring the graphene on at least one side of the target substrate:

stacking another target substrate on the graphene layer transferred onto the side of the target substrate.

11. The method as claimed in claim 1, wherein the stacked structure is directed to pass through the electrolysis bath by a roller device.

12. The method as claimed in claim 1, wherein the metal substrate includes at least one metal or alloy selected from Cu, Ni, Co, Fe, Pt, Au, Ru, Al, Cr, Mg, Mn, Mo, Rh, Si, Ta, Ti, W, U, V, Zr, brass, bronze, white brass, stainless steel, and Ge.

13. The method as claimed in claim 1, wherein the target substrate includes at least one selected from a thermal release tape, a polyethylene terephthalate substrate, a polyimide substrate, a polyethylene naphthalate substrate, a polycarbonate substrate, a glass substrate, a silicon wafer, a porous inorganic or organic membrane, a metal-organic frame, an ion-exchange film, and a membrane electrode.

14. The method as claimed in claim 1, further comprising:

cleaning the transferred graphene on the target substrate.

15. The method as claimed in claim 1, wherein the graphene transferred to the target substrate has an electrical resistance of about 1 to about 10000 Ω/sq.

* * * * *